US010630466B1

(12) United States Patent
Wilbur et al.

(10) Patent No.: US 10,630,466 B1
(45) Date of Patent: Apr. 21, 2020

(54) APPARATUS AND METHOD FOR EXCHANGING CRYPTOGRAPHIC INFORMATION WITH REDUCED OVERHEAD AND LATENCY

(71) Applicant: Hologram, Inc., Chicago, IL (US)

(72) Inventors: Patrick F. Wilbur, Potsdam, NY (US); Brian Lindemann, New London, MO (US); Erik Larson, Phoenix, AZ (US)

(73) Assignee: Hologram, Inc., Chicago, IL (US)

( * ) Notice: Subject to any disclaimer, the term of this patent is extended or adjusted under 35 U.S.C. 154(b) by 217 days.

(21) Appl. No.: 15/803,623

(22) Filed: Nov. 3, 2017

Related U.S. Application Data

(60) Provisional application No. 62/417,198, filed on Nov. 3, 2016.

(51) Int. Cl.
| | | |
|---|---|---|
| *H04L 9/08* | (2006.01) | |
| *H04L 9/32* | (2006.01) | |
| *H04L 9/06* | (2006.01) | |

(52) U.S. Cl.
CPC .......... *H04L 9/0825* (2013.01); *H04L 9/0838* (2013.01); *H04L 9/0643* (2013.01); *H04L 9/085* (2013.01); *H04L 9/3236* (2013.01)

(58) Field of Classification Search
CPC .................................................... H04L 9/0825
See application file for complete search history.

(56) References Cited

U.S. PATENT DOCUMENTS

| | | | | |
|---|---|---|---|---|
| 5,351,293 | A * | 9/1994 | Michener | H04L 9/0822 380/44 |
| 2008/0044014 | A1* | 2/2008 | Corndorf | H04L 63/12 380/37 |
| 2009/0210712 | A1* | 8/2009 | Fort | H04L 63/1441 713/175 |
| 2012/0144193 | A1* | 6/2012 | Le Saint | H04L 9/0825 713/168 |
| 2012/0284518 | A1* | 11/2012 | Walker | H04L 9/0844 713/171 |
| 2015/0288514 | A1* | 10/2015 | Pahl | H04L 9/085 713/171 |
| 2016/0294794 | A1* | 10/2016 | Mancic | H04L 63/061 |
| 2017/0034284 | A1* | 2/2017 | Smith | H04L 67/141 |

* cited by examiner

*Primary Examiner* — Simon P Kanaan
(74) *Attorney, Agent, or Firm* — Cooley LLP

(57) ABSTRACT

A method implemented by computers includes exchanging a key between a first user and a second user. Ephemeral session keys are generated. The ephemeral session keys are generated by a first computer associated with the first user and a second computer associated with the second user. An encrypted key generation response is exchanged between the first computer and the second computer. A new session request is received. It is determined that there is a valid session state. It is confirmed that there is a valid user. It is determined that there is a valid session identification. Information between the first computer and the second computer is cryptographically exchanged in response to the valid session state, the valid user and the valid session identification.

6 Claims, 4 Drawing Sheets

APPARATUS AND METHOD FOR EXCHANGING CRYPTOGRAPHIC INFORMATION WITH REDUCED OVERHEAD AND LATENCY

CROSS-REFERENCE TO RELATED APPLICATION

This application claims priority to U.S. Provisional Patent Application Ser. No. 62/417,198, filed Nov. 3, 2016, the contents of which are incorporated herein by reference.

FIELD OF THE INVENTION

This application relates generally to cryptography. More particularly, this invention is directed toward techniques for exchanging cryptographic information with reduced overhead and latency.

BACKGROUND OF THE INVENTION

Symmetric key encryption can provide efficient, secure encryption in cases where keys can be securely exchanged, stored, and maintained, assuming keys are not compromised and plaintext data is sufficiently padded to prevent against attacks (e.g., based upon known plaintext); however, in many cases, secure key exchange itself proves to be difficult where symmetric key encryption, alone, is used.

Asymmetric key encryption provides an alternative to purely-symmetric key encryption, where a public key can be disclosed publicly and even over an insecure medium (susceptible to eavesdroppers), but without compromising plaintext encrypted using the public key, assuming that the corresponding private key remains securely stored and maintained; however, asymmetric key encryption can require more computation and/or more memory when compared to purely-symmetric key encryption, thus suffering from performance issues. Furthermore, if more than one plaintext is encrypted using the same public/private key pair, and the private key is later compromised, all prior communications that had previously been intercepted and recorded are subject to compromise, thus there is no perfect forward secrecy.

A common strategy to accommodate the weaknesses of both purely-symmetric key encryption and purely-asymmetric key encryption is to adopt both symmetric and asymmetric key encryption within a single protocol's encryption method. Secure Socket Layer (SSL) and Transport Layer Security (TLS), for example, as well as technologies built upon them (e.g., HTTPS), utilize asymmetric key encryption for the purpose of performing secure key exchange, where one party in a communication (Alice) generates a random ephemeral session key and securely sends that ephemeral session key to another party (Bob) using Bob's asymmetric public key. In SSL, TLS, and similar technologies, Bob then decrypts the random ephemeral session key using Bob's asymmetric private key, and Alice and Bob encrypt and decrypt plaintext using a mutually-agreeable symmetric key cipher algorithm where the random ephemeral session key is used as the symmetric key. This approach allows for secure key exchange using a relatively inefficient asymmetric cipher, followed by encryption using a more efficient symmetric cipher based on the temporary random key.

SSL and TLS handshaking, where initial key exchange is performed, introduces a lot of overhead in terms of the amount of data transferred. While TLS can be configured to allow sessions to be resumed across multiple connections, these are still prone to timing out and thus requiring a full handshake all over again. As such, across subsequent messages, as well as over longer periods of inactivity or a state of being disconnected, protocols like SSL and TLS (as well as HTTPS) are not efficient due to their repeated need for key agreement via handshaking.

In view of the foregoing, there is a need for improved techniques for exchanging cryptographic information.

SUMMARY OF THE INVENTION

A method implemented by computers includes exchanging a key between a first user and a second user. Ephemeral session keys are generated. The ephemeral session keys are generated by a first computer associated with the first user and a second computer associated with the second user. The first computer and the second computer each use the key and a common key derivation function to form the ephemeral session keys. An encrypted key generation response is exchanged between the first computer and the second computer. A new session request is received. It is determined that a session between the first user and the second user is still valid and therefore there is a valid session state. It is confirmed that the new session request is from a valid user and therefore there is a valid user. It is determined that the new session request has a valid session identification and therefore there is a valid session identification. Information between the first computer and the second computer is cryptographically exchanged in response to the valid session state, the valid user and the valid session identification. The cryptographically exchanged information is in response to the new session request and is implemented without exchanging keys between the first computer and the second computer.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
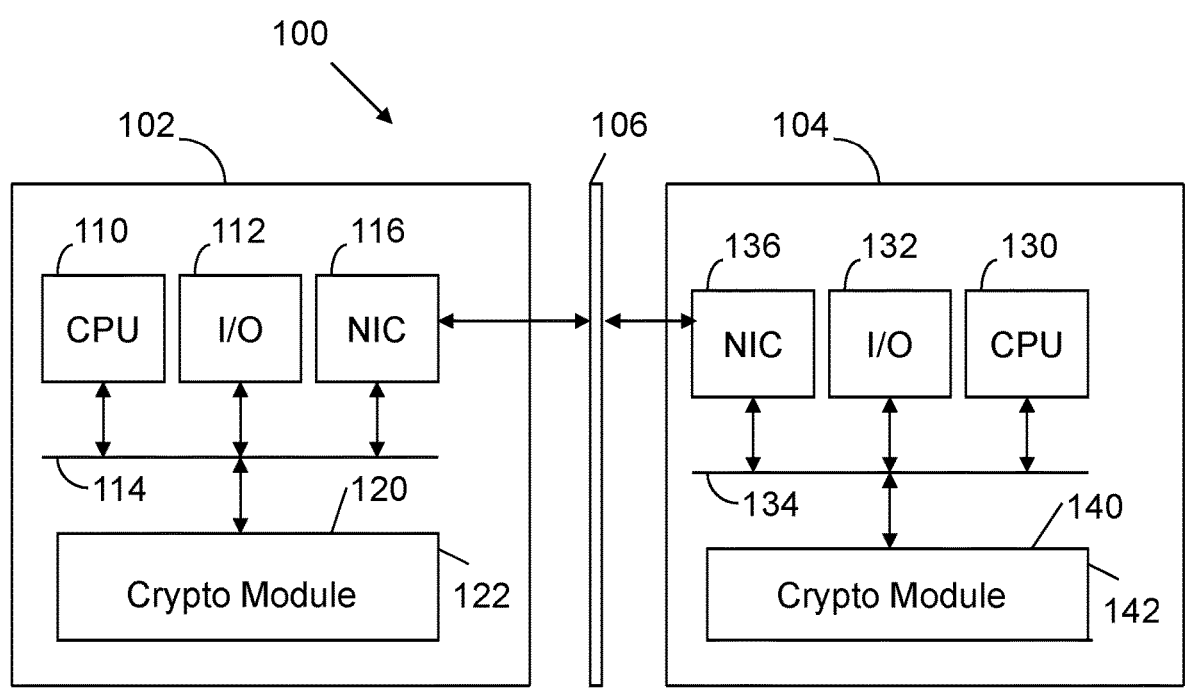
FIG. 1 illustrates a system configured in accordance with an embodiment of the invention.

FIG. 1 illustrates a system 100 including a first computer 102 associated with a first user and a second computer 104 associated with a second user. The first computer 102 and second computer 104 communicate via a network 106, which may be any combination of wired and wireless networks. The first computer includes a processor (e.g., central processing unit or CPU) 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a crypto module 122. The crypto module 122 includes instructions executed by processor 110 to implement operations disclosed herein.

The second computer 104 includes similar components, including a central processing unit 130, input/output devices 132, a bus 134, a network interface circuit 136 and a memory 140. The memory 140 stores a crypto module 142 with instructions executed by processor 130 to implement operations disclosed herein. By way of example, first computer 102 and second computer 104 may be a desktop computer, a laptop computer, a tablet, a mobile device, a wearable device and the like.

Figure 2:
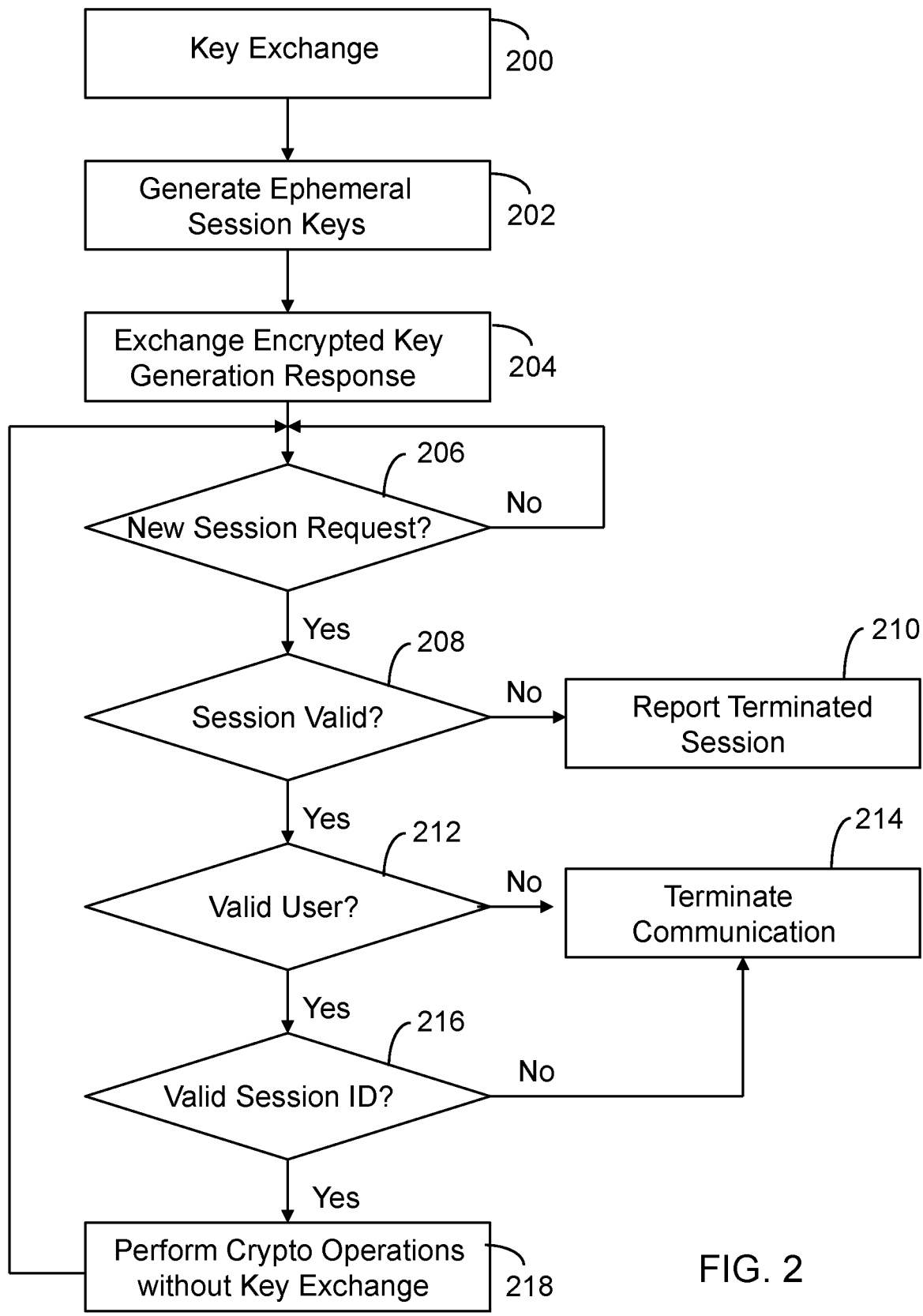
FIG. 2 illustrates processing operations associated with an embodiment of the invention.

FIG. 2 illustrates processing operations associated with an embodiment of the invention. A key is exchanged between the first user and the second user 200. The key is a shared secret that may be communicated over network 106 or may be exchanged in a separate communication channel. Ephemeral session keys are then generated 202. In particular, the crypto module 122 of the first computer 102 generates an ephemeral session key based upon application of the exchanged key to a key derivation function. Similarly, the crypto module 142 of the second computer 104 generates the same ephemeral session key based upon application of the exchanged key to the same key derivation function. An encrypted key generation response is then exchanged 204. That is, the first computer 102 and the second computer 104 exchange encrypted information characterizing parameters associated with future communications between the first user and the second user. The parameters may include a user identification for each user, a time parameter for a valid session state (e.g., a time period for which the ephemeral session keys are valid) and an initial session identification value. At this point, the two users are in a position to exchange additional cryptographic information without a key exchange.

If there is a new session request (206—Yes), it is determined whether the session is valid 208. In other words, it is determined whether the ephemeral session state defined in the initial key exchange has not expired. If the session state has expired (208—No), a terminated session is reported 210 to the machine requesting the new session. If a valid session state exists (208—Yes), it is determined whether the session request is from a valid user 212. That is, it is determined whether the user identification associated with the session request is the same as the user identification assigned during the encrypted key generation response exchange. If there is not a valid user (212—No), the communication is terminated 214. If there is a valid user (216—Yes), it is determined whether there is a valid session identification 216. The valid session identification may be an identification assigned during the encrypted key generation response or a function of such information. For example, the encrypted key generation response may specify an initial sequence number. A subsequent session may be an incremental value above the initial sequence number or an incremental value and a shared secret value above the initial sequence number. If the session identification is not valid (216—No), the communication is terminated 214. If the session identification is valid (216—Yes), cryptographic operations are performed without a key exchange 218. Thereafter, control returns to block 206.

The foregoing is more fully appreciated with the following specific examples. The first user associated with the first computer 102 will be referred to as "Alice", while the second user associated with the second computer 104 will be referred to as "Bob".

Key Agreement Keys (M) are a set of cryptographic keys that are used by a Key Derivation Function for the purpose of key agreement between Alice and Bob. The Key Agreement Keys are initially exchanged between Alice and Bob (i.e., key exchange 200 of FIG. 2) over a secure transport or operation, and then are subsequently used to derive one-time-use ephemeral session keys.

The Key Derivation Function is defined as any appropriate mathematical or cryptographic one-way function (e.g., MAC or keyed-hashing function) in which the same set of inputs produces the same mathematically derived output, and for which a mathematical inverse for that function either does not exist, is unknown, or is sufficiently hard to determine. The Key Derivation Function uses the Key Agreement Keys to generate or derive one-time-use ephemeral session keys used for authentication, identity verification, encryption, decryption, and message integrity purposes. The Key Derivation Function may reside wholly or in part within a hardware cryptographic module, within software, or within both hardware and software.

Initially, the Key Agreement Keys must be exchanged between both Alice and Bob. The Key Agreement Keys can be exchanged between Alice and Bob either offline or online. If exchanged offline, the Key Agreement Keys are exchanged using a secure physical medium. If exchanged online, either Alice or Bob detects that Alice lacks Key Agreement Keys exchanged or negotiated between Alice and Bob; as a result, the Key Agreement Key Exchange Procedure is performed in order to establish initial key agreement. For example, consider the following key agreement key exchange procedure.

1. Bob is notified through another channel (e.g., policy, manual user intervention, or an API request) that a particular Alice should be allowed to negotiate keys according to the Key Agreement Key Exchange Procedure
2. Alice contacts Bob over an appropriate Internet transport protocol to initiate the Key Agreement Key Exchange Procedure
3. Bob responds to Alice with Bob's public asymmetric key and key signature (where the signature is provided by the Root Authority to sign Bob's public key)
4. Alice validates the key's signature with a public signing key corresponding to a root certificate authority
5. Alice generates an ephemeral session key
6. Alice creates a Key Exchange Request containing:
   1. ephemeral session key (either randomly-generated or derived)
   2. Alice identifier type
   3. Alice identifier value (e.g., identifying information to uniquely identify Alice)
7. Alice encrypts the Key Exchange Request sends the encrypted Key Exchange Request to Bob
8. Bob generates a Key Generation Response containing:
   1. an identifier to be used by Alice for all future communications with Bob
   2. unique Alice-specific authentication key agreement key
   3. unique Alice-specific data encryption key agreement key
   4. additional Alice-specific key agreement key(s), as needed by the application (such as for message components intended for additional identity verification, for communicating metadata, for message routing, or to be decrypted and read by additional parties)
        5. expiration date(s) and time(s) for key(s)
    9. Bob pads (e.g., PKCS7 padding) and encrypts the Key Generation Response using the ephemeral session key. The encrypted response can then optionally be encrypted again using a pairing code negotiated out-of-band (via a separate medium) if desired by the application. Bob then sends encrypted response back to Alice.
    10. Alice decrypts and unpads response and stores each key and expiration
    11. A Key Generation Response for communications from Bob to Alice may also be generated at this time, or in the future. Two modes of operation can be supported, one of which contains a single set of exchanged keys contained in a single Key Generation Response for both Alice-to-Bob and Bob-to-Alice communications, and the other of which contains a different set of exchanged keys for Alice-to-Bob communications than for Bob-to-Alice communications; the latter mode of operation protects against the accidental re-use of a sequence number and key set by Alice and Bob that could occur if both attempt to communicate with one another using the next sequence number but neither receive those attempted communications, thus resulting in a "split-brain" inconsistency where neither Alice nor Bob know that the other already used the sequence number and therefore neither Alice nor Bob know to expire the sequence number and corresponding one-time pad. Another protection mechanism against sequence-key collision that can be supported is the use the same set of keys but different ranges of sequence numbers for Alice than for Bob, e.g., Alice using odd-numbered sequence numbers and Bob using even-numbered sequence numbers.

At any point in time, Bob can determine (e.g., through invalid authentication or through key compromise) that Alice is using an invalid/expired key; similarly, Alice can determine (e.g., through key compromise) that Alice's keys should be invalidated/expired. Either party can initiate a repeat of the Key Agreement Key Exchange Procedure.

Figure 3:
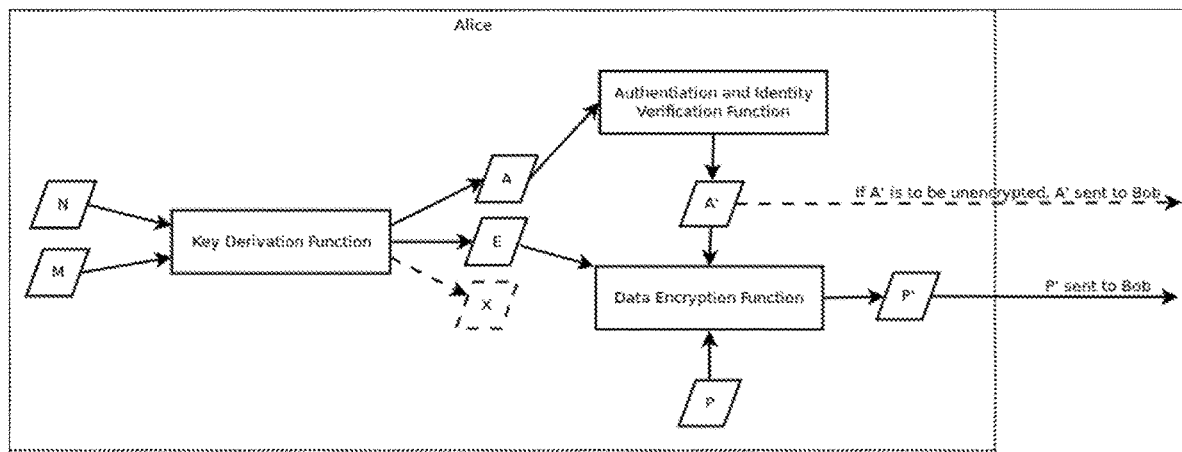
FIG. 3 illustrates encryption operations performed in accordance with an embodiment of the invention.
Figure 4:
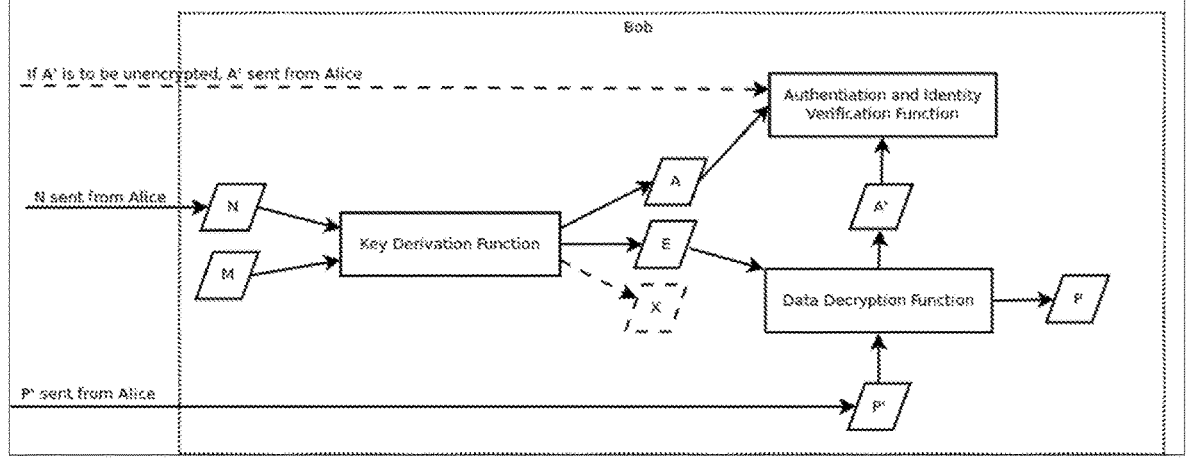
FIG. 4 illustrates decryption operations performed in accordance with an embodiment of the invention.

FIGS. 3 and 4 illustrate basic pad mode communications performed in accordance with embodiments of the invention. FIG. 3 illustrates encryption operations performed by Alice, while FIG. 4 illustrates decryption operations performed by Bob. In Basic Pad Mode, several one-time pads are generated, to be used as ephemeral keys for encrypting communications, based upon a non-repeating one-time-use sequence number and keys that were previously exchanged. Sequence numbers duplication is forbidden to prevent against replay and other attacks, which also ensures that ephemeral keys are used only once. For each transmission from Alice to Bob, Alice chooses the next sequence number such that the sequence number is ever-increasing; however, Alice can choose to skip a random number of potential sequence numbers between the last-used sequence number and the next-used sequence number.

In one embodiment, the procedure for Alice to communicate to Bob in Basic Pad Mode is as follows:
    1. Alice uses a unique sequence number (N) and the Key Derivation Function to generate:
        1. an authentication ephemeral key (A) or OTP (one-time pad) derived from the unique sequence number and the previously-exchanged authentication key agreement key
        2. a data encryption ephemeral key (E) derived from the unique sequence number and the previously-exchanged data encryption key agreement key
        3. any additional ephemeral key(s) (X) derived from the unique sequence number and previously-exchanged additional key agreement key(s), as needed by the application
    2. Alice records sequence number to ensure the sequence number is never reused
    3. Alice creates a message containing:
        1. protocol/version identifier
        2. Alice identifier type and value
        3. sequence number (N)
        4. authentication MAC, token, or OTP (A') used to confirm Alice's identity derived from the authentication ephemeral key and an Authentication and Identity Verification Function (A' may be sent unencrypted or encrypted)
        5. encrypted data payload attachment(s) (P') derived from the data encryption ephemeral key(s), the plaintext payload message (P), and a Data Encryption Function (if A' is being encrypted, A' is combined with P and both are encrypted to form P')
        6. any additional payload attachment(s) padded and encrypted using the additional ephemeral key(s)
    4. Bob executes the Key Derivation Formula to generate ephemeral session keys necessary for identity verification, decryption, and handling any additional payload (s).

Alice and Bob both store the last sequence number used by Alice, and Bob mandates that new sequence numbers are greater than the last sequence number, in order to prevent against replay attacks. Since a legitimate Alice is always aware of Alice's last-used sequence number, the true Alice should never send a message with a sequence number that is not greater than the last sequence number. Alice never reuses a sequence number so that OTPs are never reused.

Figure 5:
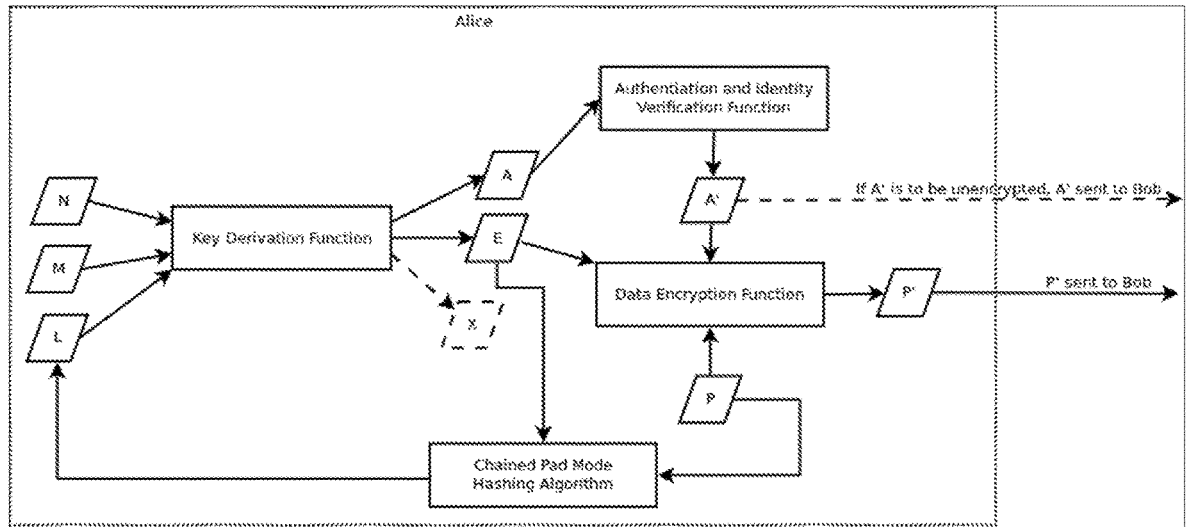
FIG. 5 illustrates chained pad mode encrypted operations performed in accordance with an embodiment of the invention.
Figure 6:
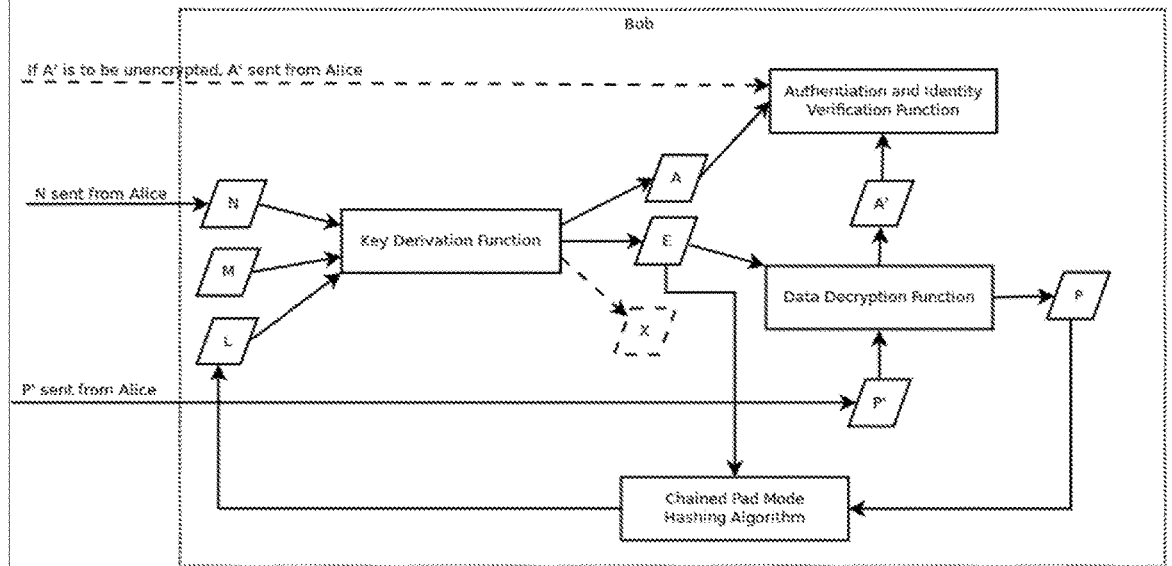
FIG. 6 illustrates chained pad mode decryption operations performed in accordance with an embodiment of the invention.

FIGS. 5 and 6 illustrate Chained Pad Mode operations performed in accordance with an embodiment of the invention. FIG. 5 illustrates chained pad mode encryption operations performed by Alice, while FIG. 6 illustrates chained pad mode decryption operations performed by Bob. One-time pads are generated for use as ephemeral keys, based upon three components: an optional non-repeating one-time-use sequence number, keys that were previously exchanged, and a hashed version of the previous sequence's ephemeral key and previous sequence's plaintext data. For each transmission from Alice to Bob, Alice chooses the optional next sequence number such that the sequence number is ever-increasing; however, Alice can choose to skip a random number of potential sequence numbers between the last-used sequence number and the next-used sequence number.

Chained Pad Mode adds additional security in that, in the event of a compromise of the originally-exchanged keys, an attacker cannot impersonate Alice nor can an attacker decrypt a given message sent from Alice to Bob unless that attacker has recorded every message ever sent from Alice to Bob, because an attacker would need to know the originally-exchanged keys, (if sequence numbers are used) all the gaps (skipped numbers) in the sequence numbers as chosen by Alice, and all the plaintext data ever sent from Alice to Bob. Additionally, in the event of a compromise of the most-recent ephemeral session key, an attacker cannot compromise the plaintext data sent from Alice to Bob in prior messages, because the hash algorithm is a one-way function and, therefore, has no inverse.

The procedure for Alice to communicate to Bob in Chained Pad Mode is as follows.
1. Alice uses a unique sequence number and the Key Derivation Function to generate:
   1. an authentication ephemeral key or OTP (A) derived from the unique sequence number and the authentication key agreement key and a hashed version of the last-used authentication ephemeral key and last-sent plaintext data (L)
   2. a data encryption ephemeral key (E) derived from the unique sequence number and the previously-exchanged data encryption key agreement key and a hashed version of the last-used data encryption ephemeral key and last-sent plaintext data (L)
   3. any additional ephemeral key(s) (X) derived from the unique sequence number and previously-exchanged additional key agreement key(s) and the hashes of the corresponding last-used additional ephemeral key(s), as needed by the application
2. Alice records sequence number to ensure the sequence number is never reused
3. Alice creates a payload containing:
   1. protocol/version identifier
   2. Alice identifier type and value
   3. sequence number (N)
   4. authentication MAC, token, or OTP (A') used to confirm Alice's identity derived from the authentication ephemeral key and an Authentication and Identity Verification Function (A' may be sent unencrypted or encrypted)
   5. encrypted data payload attachment(s) (P') derived from the data encryption ephemeral key(s), the plaintext payload message (P), and a Data Encryption Function (if A' is being encrypted, A' is combined with P and both are encrypted to form P')
   6. any additional payload attachment(s) padded and encrypted using the additional ephemeral key(s)
4. Bob executes the Key Derivation Formula to generate ephemeral session keys necessary for identity verification, decryption, and handling any additional payload (s).

If sequence numbers are used, Alice and Bob both store the last sequence number used by Alice, and Bob mandates that new sequence numbers are greater than the last sequence number, in order to prevent against replay attacks. Since a legitimate Alice is always aware of Alice's last-used sequence number, the true Alice should never send a message with a sequence number that is not greater than the last sequence number.

In addition to these two modes, various protocol options for use during communications can be negotiated between Alice and Bob, depending upon the availability of each option within each ends' protocol implementation. That is, dependent upon functionality incorporated into the crypto module 122 and 142.

During the Key Agreement Key Exchange Procedure, any mutually-supported asymmetric key encryption algorithm may be used for the first stage of encryption. For the second stage of encryption, any mutually-supported encryption algorithm may be used while utilizing the ephemeral session key.

Any mutually-supported asymmetric key encryption algorithm or symmetric key encryption algorithm may be used while utilizing the one-time pads as subsequent ephemeral keys. One-time ephemeral session keys derivation and passcode derivation, as well as chaining, both require a hashing (HMAC) algorithm to be used, and any mutually-agreeable cryptographic hashing algorithm may be used. Any key length that can be supported by the encryption algorithm chosen may be used.

Any padding scheme that transforms data from original length into a length that is aligned with lengths that are acceptable by the encryption algorithm chosen (e.g., PKCS7 for AES encryption) may be used. Compression is common in networking and Internet communications; similarly, an implementation may incorporate compression on pre-encrypted data and/or post-encrypted data (or the entire final message itself sent from Alice to Bob).

In order to minimize the amount of data transferred, sessions may be supported where authentication of Alice occurs in the first transmission to Bob, but not with every subsequent transmission, according to mutually-agreeable policy.

Perfect forward secrecy can be enabled if mutually supported by both Alice and Bob; in the case that the perfect forward secrecy option is enabled, an additional (random) ephemeral session key is conveyed whenever authentication information is conveyed, which is upon the start of either each transmission or each session (depending upon the connection persistence option as described, above). In the case where the perfect forward secrecy option is enabled, the conveyance of an additional random ephemeral session key does increase the overall amount of data to be transferred; however, the reduction of key exchange handshaking (like in other protocols, where handshaking is either per-transmission or per-session) still realizes an overall reduction in transferred data compared to other protocols.

Any mutually-agreeable integrity checking algorithm (e.g. checksum, Cyclic Redundancy Check, Block Hash, or similar) may be used and attached to messages from Alice to Bob, and Bob may likewise send a confirmation of integrity and/or success to Alice in a mutually-agreeable fashion.

In sum, the disclosed technology minimizes key exchange and generates ephemeral session keys based upon one-time pads/passcodes (OTPs). OTPs are able to be computed without the need to transmit an ephemeral session key with each session and/or each message. This reduces the data transfer overhead and latency associated with handshaking in other protocols, and also reduces the computational resources required. The disclosed techniques may be used over any communications transport.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method implemented by computers, comprising:
exchanging a key between a first user and a second user;
generating ephemeral session keys, wherein the ephemeral session keys are generated by a first computer associated with the first user and a second computer associated with the second user, the first computer and the second computer each using the key and a common key derivation function to form the ephemeral session keys;
exchanging between the first computer and the second computer an encrypted key generation response;
receiving a new session request;
determining that a session between the first user and the second user is still valid and therefore there is a valid session state;
confirming that the new session request is from a valid user and therefore there is a valid user;
determining whether the new session request has a valid session identification and therefore there is a valid session identification; and
cryptographically exchanging information between the first computer and the second computer in response to the valid session state, the valid user and the valid session identification, wherein the cryptographically exchanging information is in response to the new session request and is implemented without exchanging keys between the first computer and the second computer and wherein all operations are performed by the first computer or the second computer without input from an additional computer.

2. The method of claim 1 wherein the valid session identification is a valid message sequence number.

3. The method of claim 2 wherein the valid session identification is the valid message sequence number plus a shared secret value.

4. The method of claim 1 further comprising reporting a terminated session when the new session request does not result in confirming the valid session state.

5. The method of claim 1 further comprising terminating the new session request when the new session request does not result in confirming the valid user.

6. The method of claim 1 further comprising terminating the new session request when the new session request does not result in determining that there is a valid session identification.

* * * * *